United States Patent
Aoki et al.

(10) Patent No.: US 7,026,782 B2
(45) Date of Patent: Apr. 11, 2006

(54) METHOD AND APPARATUS FOR CONTROLLING SYNCHRONOUS MOTOR

(75) Inventors: Yasuaki Aoki, Kariya (JP); Hideji Yoshida, Hashima (JP); Hiroshi Amano, Nishio (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/180,563

(22) Filed: Jul. 14, 2005

(65) Prior Publication Data

US 2006/0012329 A1 Jan. 19, 2006

(30) Foreign Application Priority Data

Jul. 14, 2004 (JP) ............................. 2004-206651
Jul. 30, 2004 (JP) ............................. 2004-223377

(51) Int. Cl.
*H02P 1/46* (2006.01)
(52) U.S. Cl. ...................... 318/721; 318/700; 318/711; 318/714; 318/717
(58) Field of Classification Search ................ 318/721, 318/700, 711, 714, 717, 720, 807
See application file for complete search history.

(56) References Cited

U.S. PATENT DOCUMENTS

2005/0077793 A1 * 4/2005 Garvey et al. ............. 310/90.5
2005/0110452 A1 * 5/2005 Toyozawa et al. .......... 318/807

FOREIGN PATENT DOCUMENTS

JP     A 2004-064860     2/2004

* cited by examiner

*Primary Examiner*—Karen Masih
(74) *Attorney, Agent, or Firm*—Oliff & Berridge, PLC (57) ABSTRACT

An apparatus is provided for controlling a synchronous motor. The apparatus comprises a first calculator calculating a voltage characteristic showing a characteristic of voltages to be applied to armature coils of a stator and a producer producing a command signal to provide the armature coils with the phase currents on the basis of the voltage characteristic. The apparatus still comprises a current detector detecting a signal depending on an amplitude of at least one of the phase currents, a second calculator calculating a rate of changes in a current amount indicating amplitudes of the phase currents, by using the signal from the current detector, and a feed-back member feed-backing the rate of changes in the current amount into the calculation of the voltage characteristic.

19 Claims, 12 Drawing Sheets

METHOD AND APPARATUS FOR CONTROLLING SYNCHRONOUS MOTOR

The present application relates to and incorporates by reference Japanese Patent application Nos. 2004-206651 filed on Jul. 14, 2004 and 2004-223377 filed on Jul. 30, 2004.

BACKGROUND OF THE INVENTION

1. Field of the Invention

The present invention relates to a method and apparatus for controlling a synchronous motor.

2. Description of the Related Art

A synchronous electric motor (AC motor) is basically structured such that the motor is equipped with a stator with plural-phase armature coils and a rotor with field poles made from permanent magnets or others and currents are supplied to the armature coils to generate torque to rotate the rotor. To control the drive of the synchronous motor in an optimum fashion, it is absolutely required to detect positional information indicating the angular positions (rotational positions) of the rotor (hereinafter, called "angular positions"). The conventional synchronous motor is thus provided with a positional sensor dedicated to detecting the angular positions.

However, loading the positional sensor to a synchronous motor is obliged to be larger in size and higher in production cost. Because use of the positional sensor itself is limited to some environments, applications of the synchronous motor are also confined. With taking this situation into account, by way of example, a structure disclosed in Japanese Patent Laid-open Publication No. 2004-64860 is provided. That is, as shown therein, without employing a positional sensor, the motor is structured to know the angular positions through computation processing of bits of information showing driven states of the motor, which include the values of currents through and voltage to be applied to the armature coils. This type of motor is called "sensor-less synchronous motor."

In recent years, it has been desired that the magnetic poles of the rotor produce more amounts of flux in order to raise the efficiency of a synchronous motor. This demand is also true of the "sensor-less synchronous motor.

Figure 10:
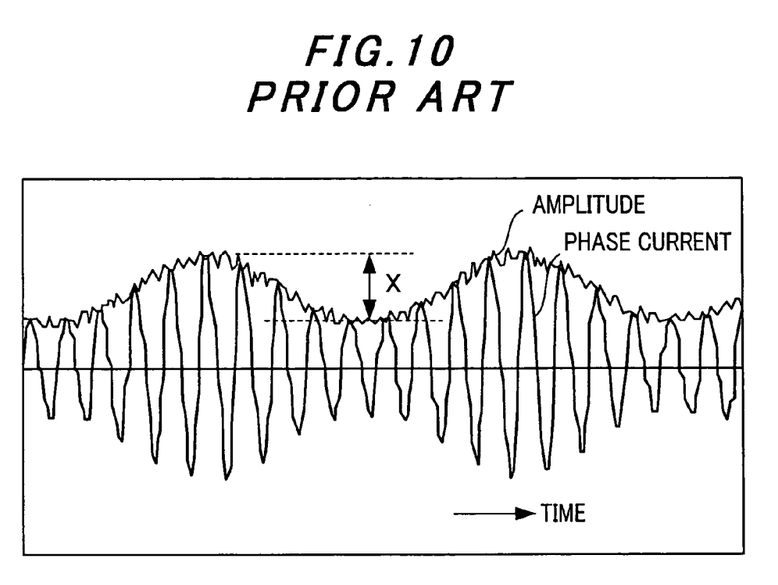
FIG. 10 shows a conventional trend of a phase current and the amplitude of the phase current.
Figure 11:
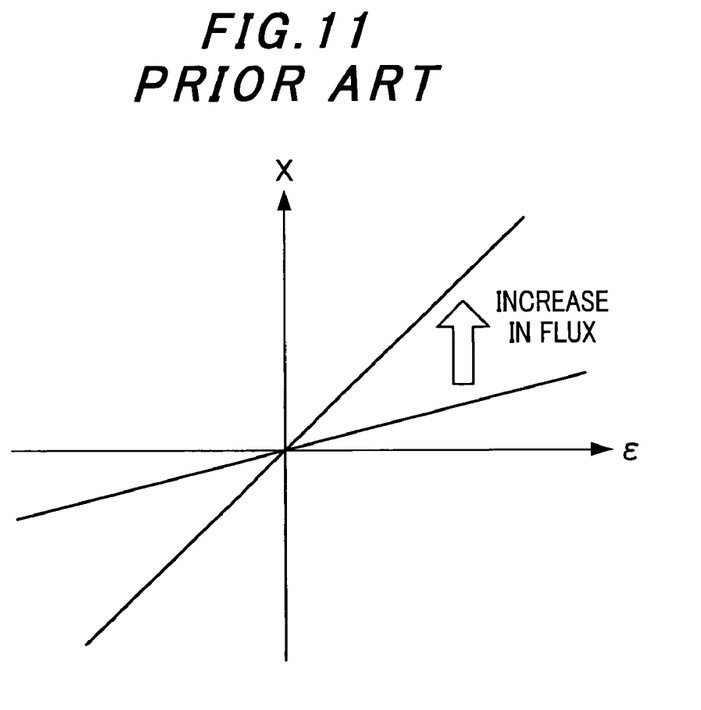
FIG. 11 shows a conventional correlation between a hunting amount of amplitude of a phase current and a rotational error.

However, in the case of the sensor-less synchronous motor, there is a drawback that a phase current shows a hunting phenomenon of its amplitude, as shown in FIG. 10. The hunting amount X (i.e., an amount of changes in a phase current) is approximately directly proportional to differences $\epsilon$ between the true values of the angular positions and the calculated values (i.e., a phase difference), as shown in FIG. 11. Thus, as the flux from the field poles increases, the gradient of the graph in FIG. 11 increases. Raising the flux for a higher efficiency of the synchronous motor, the hunting amount X will therefore become larger, thereby making the control of the synchronous motor unstable.

SUMMARY OF THE INVENTION

The present invention has been completed with the above view in mind and has an object to provide a control apparatus capable of raising the efficiency of the synchronous motor by raising the flux produced at the field poles of the rotor and reducing the hunting amount caused in the amplitudes of respective phase currents.

To achieve the above object, as one mode, the present invention provides an apparatus for controlling a synchronous motor provided with a stator with a plurality of phases of armature coils to which phase currents are supplied to rotate a rotor disposed to be opposed to the stator, the apparatus comprising: a first calculator calculating a voltage characteristic showing a characteristic of voltages to be applied to the armature coils; a producer producing a command signal to provide the armature coils with the phase currents on the basis of the voltage characteristic; a current detector detecting a signal depending on an amplitude of at least one of the phase currents supplied to the armature coils; a second calculator calculating a rate of changes in a current amount indicating amplitudes of the phase currents, by using the signal from the current detector; and a feed-back member feed-backing the rate of changes in the current amount into the calculation of the voltage characteristic.

Hence the apparatus is able to use the rate of changes in the current amount (current-amount change rate) to correct the voltage characteristic for driving the synchronous motor. Since the current-amount change rate corresponds to a hunting amount of amplitude of the phase currents, the correction based on the current-amount change rate allows changes in the hunting amount to be reflected into drive of the synchronous motor in a steadier manner. As a result, the synchronous motor is controlled to decrease the hunting amount.

Preferably, the voltage characteristic is made up of a voltage amplitude and a voltage phase of the voltages to be applied to the armature coils.

Still preferably, the first calculator comprises a calculator calculating an angular position of the rotor, a calculator calculating a rotational speed of the rotor, a voltage-amplitude calculator calculating the voltage amplitude using the angular position and the rotational speed, and a voltage-phase calculator calculating the voltage phase using the angular position and the rotational speed.

It is preferred that the feed-back member is adding members intervening between the angular position calculator and the voltage-amplitude calculator, between the rotational speed calculator and the voltage-phase calculator, after the voltage-amplitude calculator, and after the voltage-phase calculator, respectively, wherein the adding members add the rate of changes in the current amount to the angular position, the rotational speed, the voltage amplitude, and the voltage phase, respectively, so that the rate is fed back to the angular position, the rotational speed, the voltage amplitude, and the voltage phase, respectively.

DETAILED DESCRIPTION OF PREFERRED EMBODIMENTS

Various embodiments of a control apparatus controlling a synchronous motor according to the present invention will now be described below in detail with reference to the accompanying drawings.

First Embodiment

Referring to FIGS. 1 to 4, a first embodiment of the control apparatus will now be described.

Figure 1:
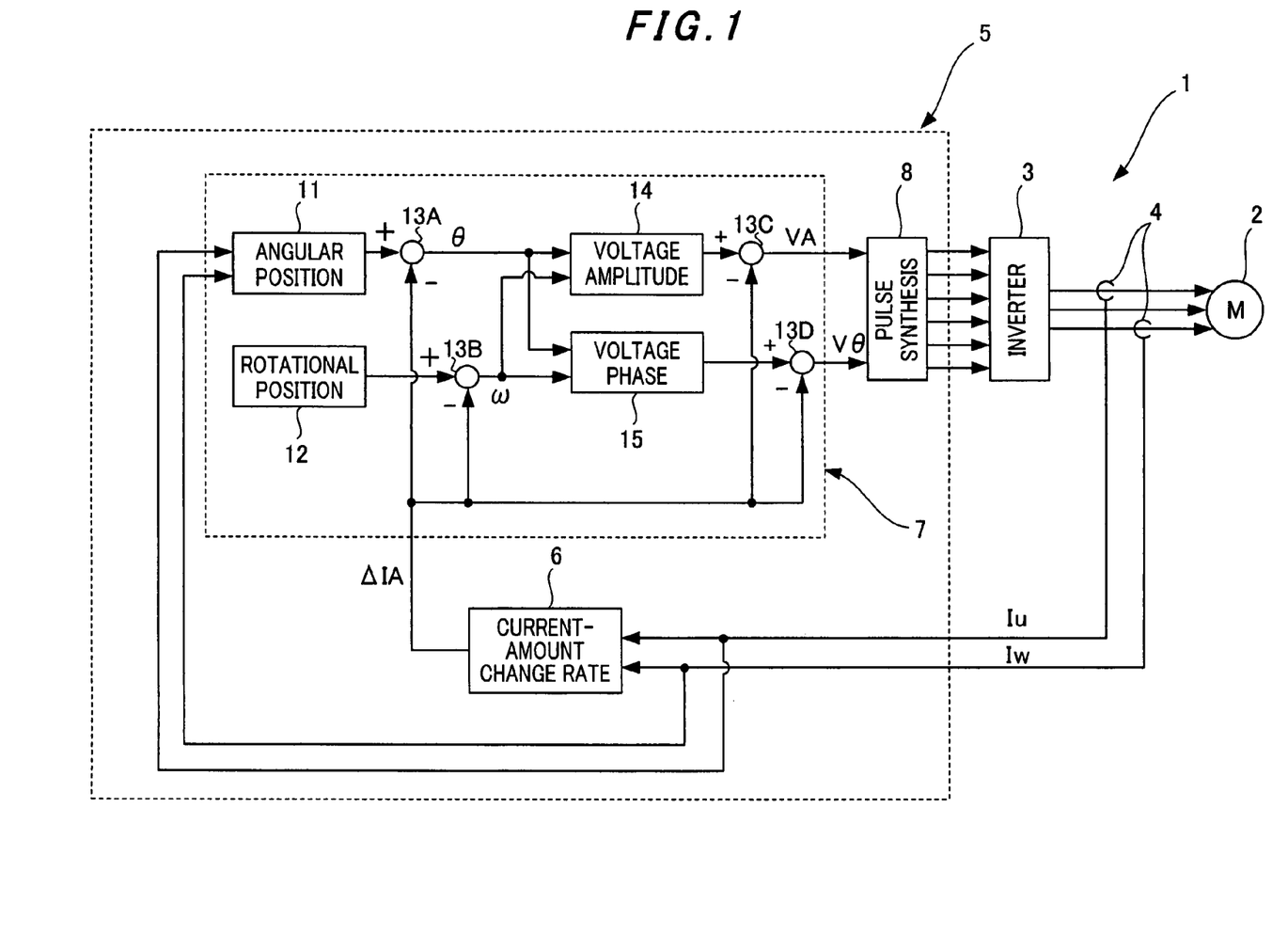
FIG. 1 is an electrical block diagram showing a control apparatus for a synchronous motor, which is according to a first embodiment of the present invention.
Figure 2A:
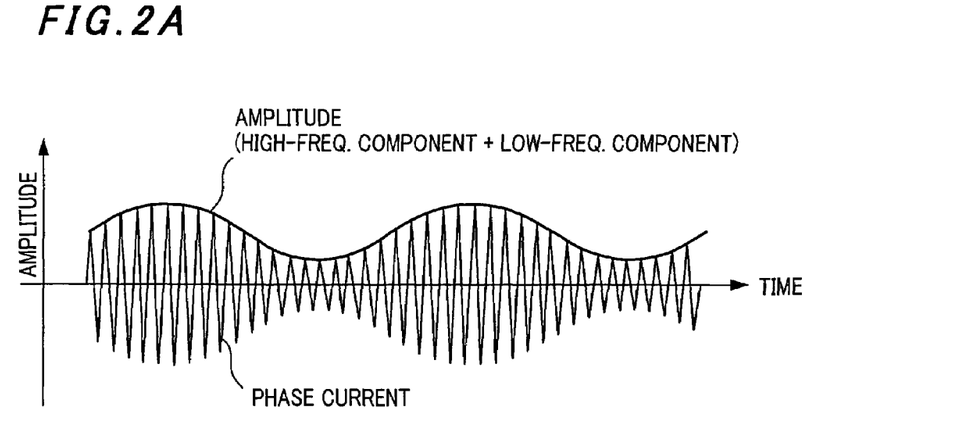
FIG. 2A illustrates the amplitude of a phase current.
Figure 2B:
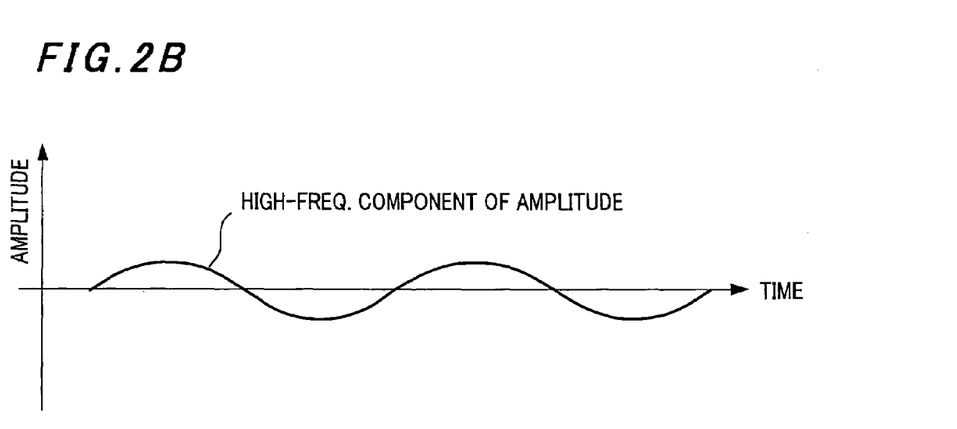
FIG. 2B illustrates a high-frequency component of the amplitude of the phase current shown in FIG. 2A.

FIG. 1 shows the overall configuration of a control apparatus 1 for a synchronous motor 1, which is according to the first embodiment, will now be described.

The control apparatus 1 controls the drive of a synchronous motor 2 and is provided with an inverter 3, current sensor 4, and an electronic control unit (ECU) 5 in order to perform such a control.

The synchronous motor 2 is structured so that the motor comprises a stator with the three-phase (U, V and W phases) armature coils (not shown) to be subjected to current supply and a rotor with field poles (not shown) such as permanent magnets. Thus supplying current to the armature coils produces torque to rotate the rotor. Both the stator and the rotor are omitted from the drawings.

Supplying current to each of the armature coils is carried out using an inverter 3, which works based on a command signal from the ECU 5. As is known, the inverter 3 comprises at least six electrical switching elements (not shown). Each switching element responds to six command signals coming from the control apparatus 1, to turn on/off depending on the command signals. Through the actions of each switching element, three-phase AC currents whose phases are different from each other (hereinafter, such AC currents are called "phase currents") are supplied from a power supply (not shown) to the armature coils.

Primary components of the control apparatus 1 include the current sensors 4, which can be structured well known to detect a phase current, and the ECU 5, which are listed above.

The current sensors 4 detect phase currents flowing through the U and W phases serving as currents to be detected and function as current detecting means for detecting the phase currents to output signals indicative of detected currents Iu and Iw (current detection signals) depending on the U-phase and W-phase currents.

The ECU 5 is structured into a known microcomputer with a CPU (central processing unit), storages, output devices, and input devices. Using various pieces of information including the current detection signals Iu and Iw from the current sensors 4, the ECU 5 is configured to calculate a voltage characteristic showing the characteristic of voltage to be applied to each armature coil and uses this voltage characteristic to combine the command signals to be outputted to the inverter 3 on the basis of a voltage characteristic.

In addition, through the processing carried out by the CPU based on a software program previously stored in a memory therein, the ECU 5 functionally realizes a current-amount change rate calculator 6, a voltage characteristic calculator 7, and a pulse synthesizer 8. Further, the software program previously stored in the memory of the ECU 5 allows the CPU to perform the processing at respective blocks 11–14 and 13A–13D at an appropriate order. Those blocks 11–14 and 13A–13D and the foregoing blocks 6 and 8, which will be detailed later, are readable as a kind of flowchart showing the operations performed by the CPU, that is, the ECU 5. Of course, those blocks 11–14, 13A–13D, 6 and 8 may be structured into electrical circuits using digital logic components and analog components.

In the ECU 5, the current-amount change rate calculator 6 uses the current detection signals Iu and Iw in order to compute a rate of changes in an amount of current, which indicates the magnitude of the phase current. Thus this calculator 6 serves as current-amount change rate calculating means. The voltage characteristic calculator 7 calculates the voltage characteristic and feeds back the calculated current-amount change rate to the calculation of the voltage characteristic. This calculator 7 serves as voltage characteristic calculating means. Based on the voltage characteristic, the pulse synthesizer 8 synthesizes pulsed command signals to be outputted to the inverter 3.

Specifically, the current-amount change rate calculator 6 calculates a rate of changes in the amplitude of a phase current hereinafter, referred to as a current-amplitude change rate") per unit time, "$\Delta IA$." In the present embodiment, the amplitude of the phase current corresponds to a "current amount" stated in the present invention. In addition, this calculator 6 uses the current detection signals Iu and Iw to calculate both of the high frequency component of amplitude of a phase current (i.e., current amount) and the current-amplitude change rate $\Delta IA$, using the calculated high frequency component.

The voltage characteristic calculator 7 functionally includes a position estimator 11, a speed commanding unit 12, a voltage-amplitude calculator 14, a voltage-phase calculator 15, and adders 13A–13D. Of these, the position estimator 11 estimates an angular position $\theta$ of the rotor by using the calculated current detecting signals Iu and Iw. To be specific, in order to obtain the angular position $\theta$, the position estimator 11 uses the current detection signals Iu and Iw as parameters to resolve a motor characteristic formula or make reference to a motor characteristic map.

The speed commanding unit 12 responds to a request issued from an upper device which controls the vehicle engine, for example, thought not shown in FIG. 1, so that a rotation speed $\omega$ of the rotor.

The voltage-amplitude calculator 14 uses the calculated angular position $\theta$ and rotational speed $\omega$ to compute an amplitude of voltage to be applied (hereinafter, referred to as a "voltage amplitude") VA to each armature coil. Further, by using both of the angular position θ and the rotational speed ω, the voltage-phase calculator 15 calculates a phase of voltage to be applied (hereinafter, referred to as a "voltage phase) Vθ to each armature coil. In the present embodiment, both of the voltage amplitude VA and the voltage phase Vθ expresses the "voltage characteristics" stated in the present invention.

The adders 13A–13D functionally included in the calculator 7 are for correction of the values calculated by the components 11–15. Concretely, the adders 13A–13D are used to add a current-amplitude change rate ΔIA to the calculated results at the position estimator 11, speed commanding unit 12, voltage-amplitude calculator 14, and voltage-phase calculator 15, respectively. The values which are resultant from the addition are sent to the next-stage components thereto, respectively, as shown in FIG. 1.

By the way, each of the adders 13A–13D employed above has a positive-polarity input receiving the signal indicating the angular position θ, rotational speed ω, voltage amplitude VA, or voltage phase Vθ and a negative-polarity input receiving the current-amplitude change rate ΔIA. Thus these adders 13A–13D can also be understood as subtracters, which subtract the current-amplitude change rate ΔIA from the angular position θ, rotational speed ω, voltage amplitude VA, or voltage phase Vθ, respectively.

In the voltage characteristic calculator 7, the current-amplitude change rate ΔIA is reflected (i.e., fed back) in the computation of the angular position θ, rotation speed ω, voltage amplitude VA, and voltage phase Vθ. Specifically, current-amplitude change rate ΔIA is used correct the angular position θ, rotation speed ω, voltage amplitude VA, and voltage phase Vθ. Thus, both of the angular position θ and the rotation speed ω are first subjected to correction based on the current-amplitude change rate ΔIA, and then used for calculating both of the voltage amplitude VA and the voltage phase Vθ. The same is applied to the voltage amplitude VA and voltage phase Vθ. That is, both of the voltage amplitude VA and the voltage phase Vθ are subjected to correction based on the current-amplitude change rate ΔIA, and then used for synthesizing pulse signals at the pulse synthesizer 8 so that command signals are finally supplied to the inverter 3.

In this section, how to compute the current amount will now be exemplified.

Figure 4A:
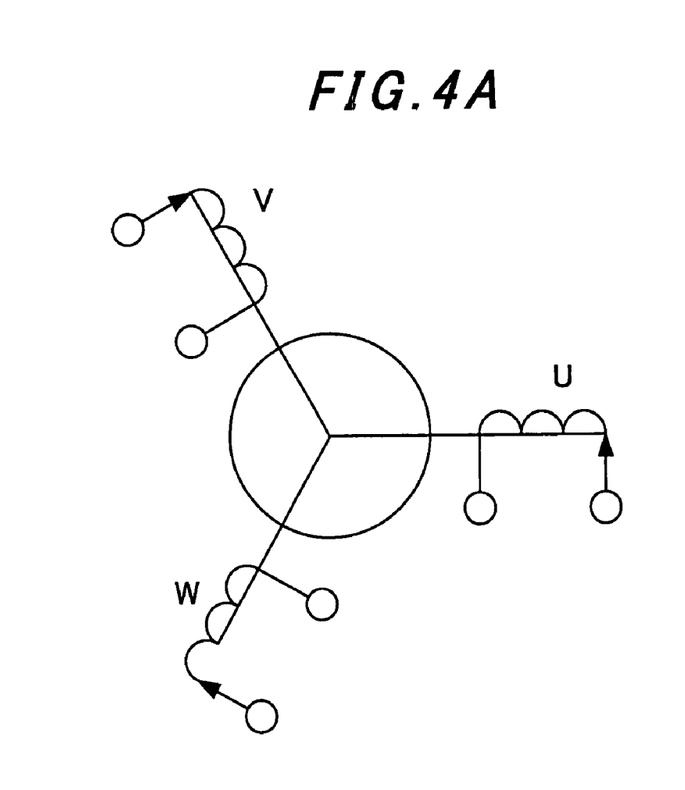
FIGS. 4A and 4B show illustrations for converting the U-, V- and W-phase currents to two $\alpha$-axis and $\beta$-axis currents, which is for calculating a current vector for a current-amount change rate.
Figure 4B:
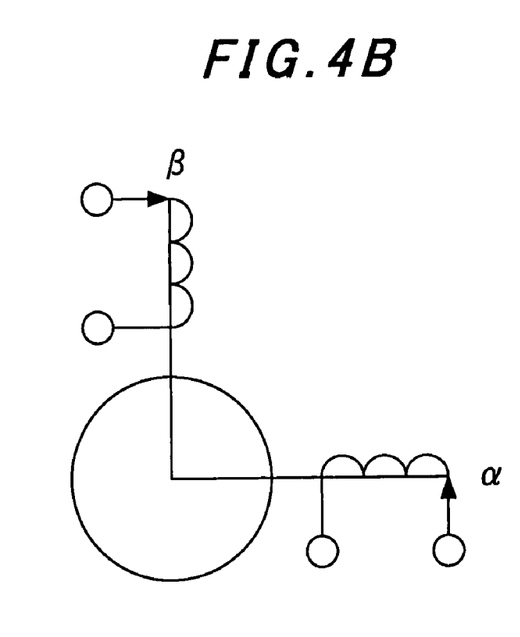

The current amount to be targeted in the control apparatus 1 is an amplitude Iαβ of a current vector (Iα, Iβ) obtained by converting the three-phase currents flowing through the U, V and W phases of the armature coils, into vectors along two stationary mutually-orthogonal axes (i.e., α-axis and β-axis) Iα is an α-axis current and Iβ is a β-axis current. Therefore, as the current-amount change rate, which is computed in the calculator 6 and fed back to the calculator 7, a rate ΔIαβ of changes in the amplitude Iαβ of the current vector (Iα, Iβ) can be employed (hereinafter, the rate ΔIαβ is called "current-vector change rate").

The amplitude Iαβ of the current vector (Iα, Iβ) is expressed by the following formula:

$$Iαβ = (Iα^2 + Iβ^2)^{1/2} \tag{1}$$

The actual computation of the amplitude Iαβ of the current vector (Iα, Iβ) on the formula (1) can be performed using the following formulae showing approximate calculation. When it is assumed that N is a certain numeral value and "a" is square root of N, that is, $$a = (N)^{1/2} \tag{2},$$

the approximate calculation is $$a_{n+1} = \tfrac{1}{2}(a_n + N/a_n). \tag{3}$$

Thus, the amplitude Iαβ of the current vector (Iα, Iβ) can be approximated by using this formula (3).

Thus, the current-vector change rate ΔIαβ can be fed back to the calculation of the voltage amplitude VA and the voltage phase Vθ. As a result, regardless of the angular positions e, the phase amplitudes of the U, V and W phases can be used solely to compute the current amount, which leads to a more precise and steadier computation of the current amount.

The operations and advantages of and from the control apparatus 1 will now be described.

The current sensors 4 detect the phase currents at the U- and W-phases, resulting in the output of the current detection signals Iu and Iw. These signals Iu and Iw are then sent to the ECU 5, where the current-amount change rate calculator 6 uses the signals Iu and Iw to calculate the current-amplitude change rate ΔIA and the position estimator 11 uses the signals Iu and Iw to calculate the angular position θ. Concurrently the rotation speed ω is calculated by the speed commanding unit 12 in response to a request issued from the upper device.

The calculated current-amplitude change rate ΔIA is then fed back to the voltage characteristic calculator 7. In this calculator 7, an angular position θ calculated by the position estimator 11 and a rotation speed ω calculated by the speed commanding unit 12 are added by the rate ΔIA at the adders 13A and 13B, with the result that the angular position θ and rotation speed ω are corrected, respectively.

These corrected angular position θ and rotation speed ω are then subject to the calculation at the voltage-amplitude calculator 14 and the voltage-phase calculator 15, respectively, whereby a voltage amplitude VA and a voltage phase Vθ, which have already once undergone the reflection of the current-amplitude change rate ΔIA, are calculated.

The calculated voltage amplitude VA and voltage phase Vθ are also subject to addition of the current-amplitude change rate ΔIA at the adders 23 and 24. Hence the voltage amplitude VA and voltage phase Vθ are also corrected-such that the current-amplitude change rate ΔIA is reflected in those values. Thus the voltage amplitude VA and voltage phase Vθ, which have been amended as above, are sent to the pulse synthesizer 8.

In the pulse synthesizer 8, in response to the corrected voltage amplitude VA and voltage phase Vθ, which are provided in the form of pulse signals, the pulse signals are synthesized to form command signals (pulsed signals) the three phases, which are then sent the switching elements in the inverter 3, respectively. The switching elements, which are realized by transistors, for instance, operate based on the command signals in a manner such that currents each flowing through each switching element is switched on/off. Hence the phase currents are adjusted phase by phase, so that the synchronous motor 2 is driven in an optimally controlled manner in answer to requests from the upper device.

As described, in the control apparatus 1 according to the present embodiment, phase currents at the U and W phases are detected to calculate a current-amplitude change rate ΔIA and this rate ΔIA is fed back (i.e., reflected) into the computation of a voltage amplitude VA and a voltage phase Vθ in the two-stage manner.

Figure 3:
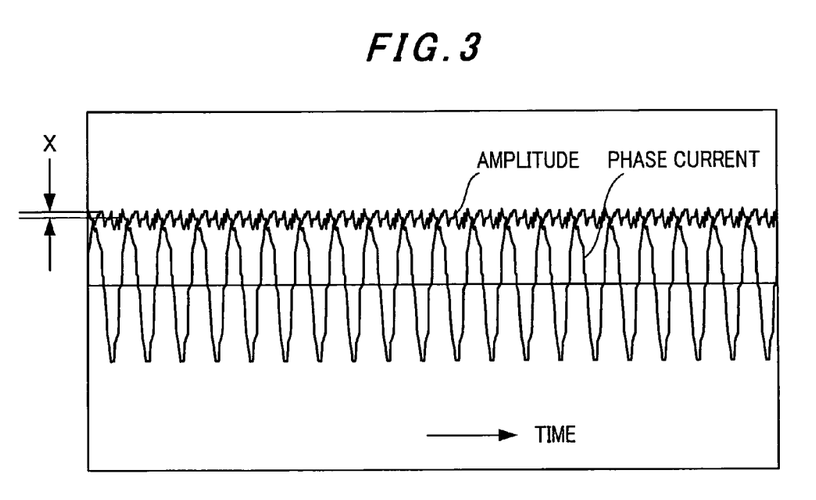
FIG. 3 illustrates a phase current and the amplitude of the phase current, which shows an advantage gained in the first embodiment.

Hence, depending on the current-amplitude change rate ΔIA, which corresponds to a hunting amount X of the amplitude of the phase current, both of the voltage amplitude VA and the voltage phase Vθ can be corrected. This correction makes it possible to take into account the hunting amount X in driving the synchronous motor 2. Accordingly, the positional error ε in controlling the synchronous motor 2 is decreased, and as shown in FIG. 3, the hunting amount X can be lessened greatly.

Second Embodiment

Figure 5:
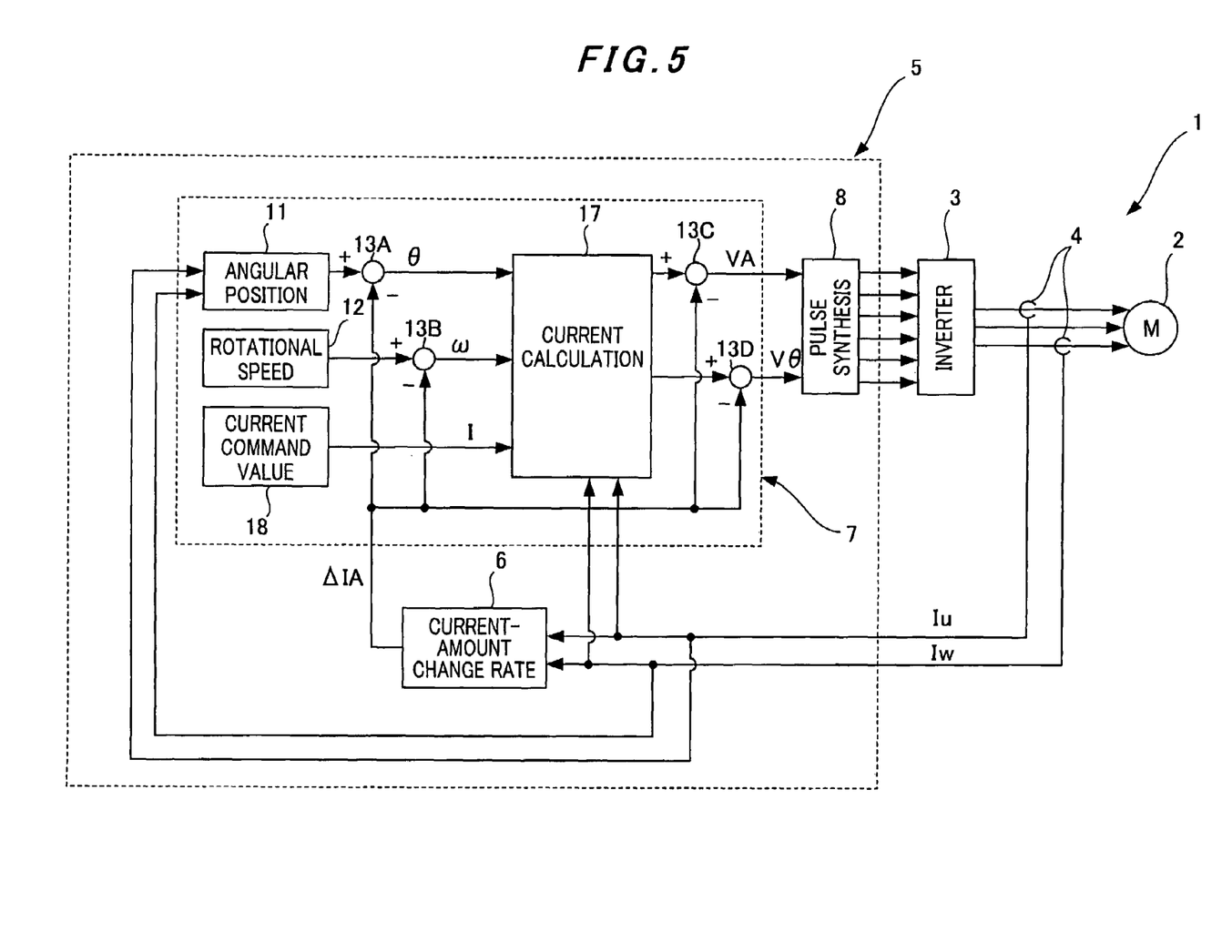
FIG. 5 is an electrical block diagram showing a control apparatus for a synchronous motor, which is according to a second embodiment of the present invention.

Referring to FIG. 5, a first embodiment of the control apparatus will now be described. In the second embodiment and subsequent embodiments, the components identical or similar to the components in the first embodiment will now be described will be given the same reference numerals, simplifying the explanations.

In the second embodiment, a voltage characteristic calculator 7A is provided, which is different in part from the voltage characteristic in FIG. 1. To be specific, in this characteristic calculator 7A, a current controller 17 is included in place of the calculators 14 and 15 in FIG. 5, a current command-value storage 18 is additionally included, and the current detection signals Iu and Iw are supplied to both of the position estimator 11 and the current controller 17.

The current controller 17 is configured to calculate a voltage-amplitude VA and a voltage phase Vθ so that the measured phase currents are made to be equal to current command values serving as target values. Meanwhile the current command-value storage 18 stores therein the current command values in the forms of data and programs agreeing with requests from upper devices.

A current command value I is decided at the current command-value storage 18 depending on requests from upper devices. The decided current command value I is given to the current controller 17, where phase currents are measured using the received current detection signals Iu and Iw and differences between the measured phase currents and the current command values I are used to calculate a voltage amplitude VA and a voltage phase Vθ, respectively. This calculation of both of the voltage amplitude VA and the voltage phase Vθ in the current controller 17 is based on both of an angular position θ and a rotation speed ω which have been corrected on the current-amplitude change rate ΔIA.

Hence the configurations in the present embodiment give the advantages equivalent to those acquired in the first embodiment.

Third Embodiment

Figures 6A, 6B:
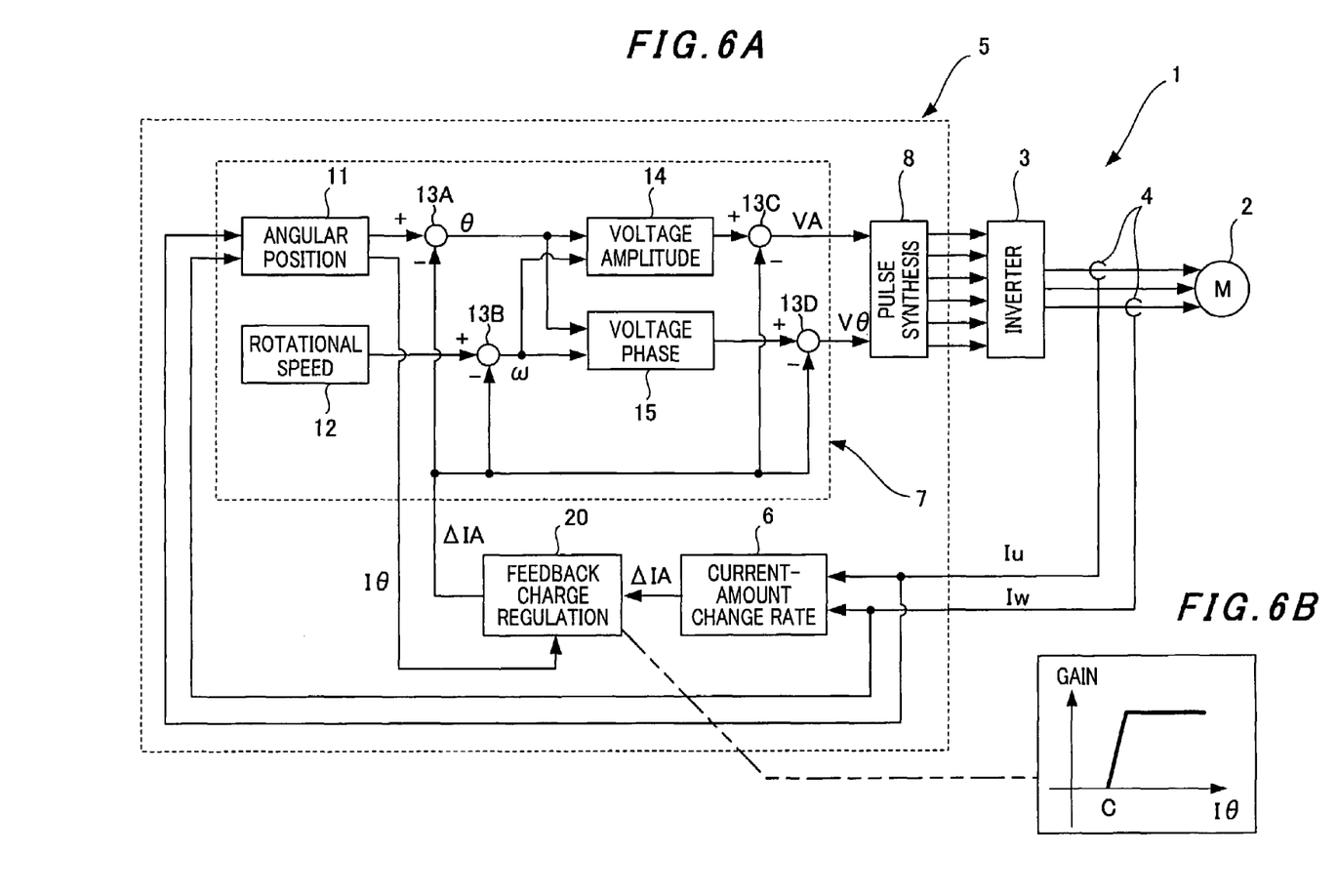
FIG. 6A is an electrical block diagram showing a control apparatus for a synchronous motor, which is according to a third embodiment of the present invention.
FIG. 6B is a graph exemplifying a gain characteristic, that is, a feedback characteristic employed in the third embodiment.

Referring to FIGS. 6A and 6B, a third embodiment of the control apparatus will now be described.

In the present embodiment, as shown in FIG. 6A, there is additionally provided a feedback characteristic regulator 20. This regulator 20 is functionally included between the current-amount change rate calculator 6, and the adders 13A to 13D and the position estimator 11.

The feedback characteristic regulator 20, which functions as the feedback-characteristic adjusting means, intends to change (control) the feedback characteristic based on the phases of the phase currents. As described already, the feedback characteristic represents a characteristic to decide how the current-amplitude change rate ΔIA is fed back (reflected) into the calculation of both the voltage amplitude VA and the voltage phage Vθ.

An object to be adjusted (controlled) by the feedback characteristic regulator 20, that is, the feedback characteristic, is a gain of the feedback loop. Accordingly, when the current-amplitude change rate ΔIA is fed back from the current-amount change rate calculator 6 to the voltage characteristic calculator 7, the feedback gain is adjusted in accordance with the phase of a phase current (hereinafter, referred as a "current phase") which has a larger amount of correlation with the positional error ε.

More specifically, a threshold C is given to the current phase Iθ and a comparison between the current phases Iθ and the threshold C are compared to decide a desired gain providing the feedback characteristic. An example is given in FIG. 6B. As comprehensive from a gain curve shown in FIG. 6B, current phases Iθ larger than the threshold C give a predetermined constant value to the gain, whilst current phases ie smaller than the threshold C give zero to the gain. Because the current phases Iθ are closely correlated with the positional errors ε, the position estimator 11 additionally calculates the current phases Iθ together with the angular positions θ.

The operations of the control apparatus 1 according to the present embodiment will now be described.

The position estimator 11 uses the current detection signals Iu and Iw to a current phase Iθ. This calculated result, that is, the calculated current phase Iθ is provided to the feedback characteristic regulator 20, where the calculated current phase Iθ is compared with the threshold C. When the current phase Iθ is larger than or equal to the threshold C, the gain is set to predetermined values, while when the current phase Iθ is smaller than the threshold C, the gain is designated as being zero.

As described, in the control apparatus 1, the current phase Iθ which is closed correlated with the positional error ε is subjected to a comparison with the threshold C. As a result, the gain is set to predetermined values or zero, depending on the compared results.

Figure 12:
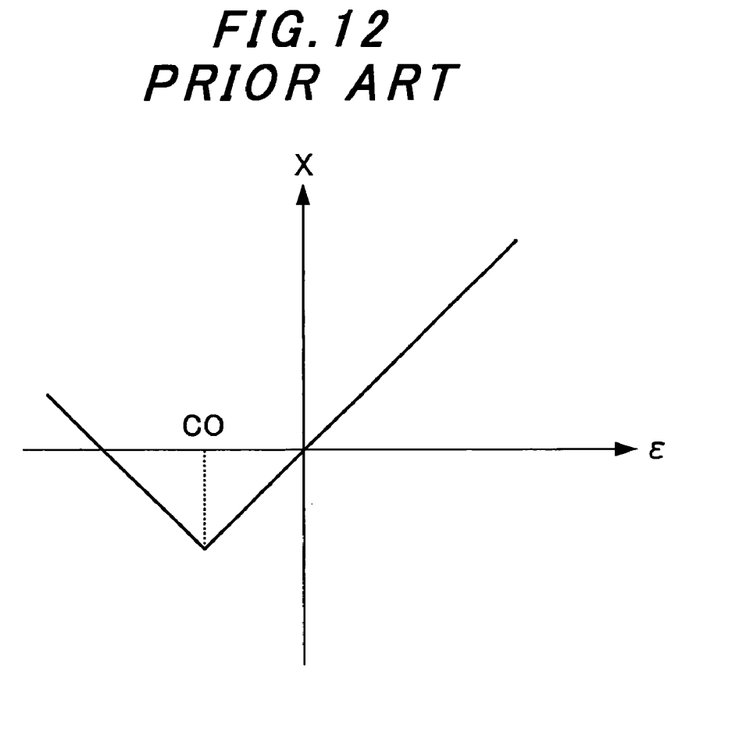
FIG. 12 shows another conventional correlation between a hunting amount of amplitude of a phase current and a rotational error.

In FIG. 12, the conventional correlation between the positional error ε and the hunting amount X is illustrated. As shown, the gradient of the correlation curve is turned from its negative one to its positive one at a predetermined positional error ε(=CO). Hence, in cases where, in a range where the positional error ε is smaller than the predetermined value CO, the gains, whose amounts are the same as those in a region where the positional error ε is larger than the predetermined value C, are multiplied by a current-amplitude change rate ΔIA, a correction results in being reverse to a desired correction based on a voltage amplitude VA and a voltage phase Vθ.

In contrast, in the control apparatus 1 according to the present embodiment, a threshold C corresponding to a predetermined value CO is set for the current phases Iθ closely correlated with the positional error ε. When a current phase Iθ is larger than or equal to the threshold value C, the gain is a predetermined value. If the opposite condition to that is met, the gain is zero. Therefore, in the region where the positional error ε is less the threshold CO, the gain can be prevented from being corrected in the opposite way, like the conventional.

In particular, in the conventional, when the load torque is small and the phase currents are small, it is difficult to calculate the current-amplitude change rate ΔIA. Hence, deliberately delaying the current phase Iθ (i.e., the positional error ε is made larger in the negative direction) increases the phase currents. There is therefore a fear that the foregoing reverse correction is carried out for small mounts of load torque.

However, the control apparatus 1 according to the present embodiment is able to cope with such a conventional drawback as well. In other words, the gain is set not only to predetermined values as to current phases Iθ larger than or equal to the threshold C but also to zero as to current phases Iθ smaller than the threshold C. Thus, even if the phase currents are smaller, the synchronous motor 2 can be controlled so that the hunting amount X reduces with steadiness.

In order to prevent the gain from causing the hunting, the correlation characteristic between the current gain Iθ and the gain may have a hysteresis characteristic. Thus a threshold designated to find current phases Iθ becoming larger can be distinguished from a further threshold designated to find current phases Iθ becoming smaller. As another modification, the gain may be changed moderately along a lamp curve.

Fourth Embodiment

Figure 7:
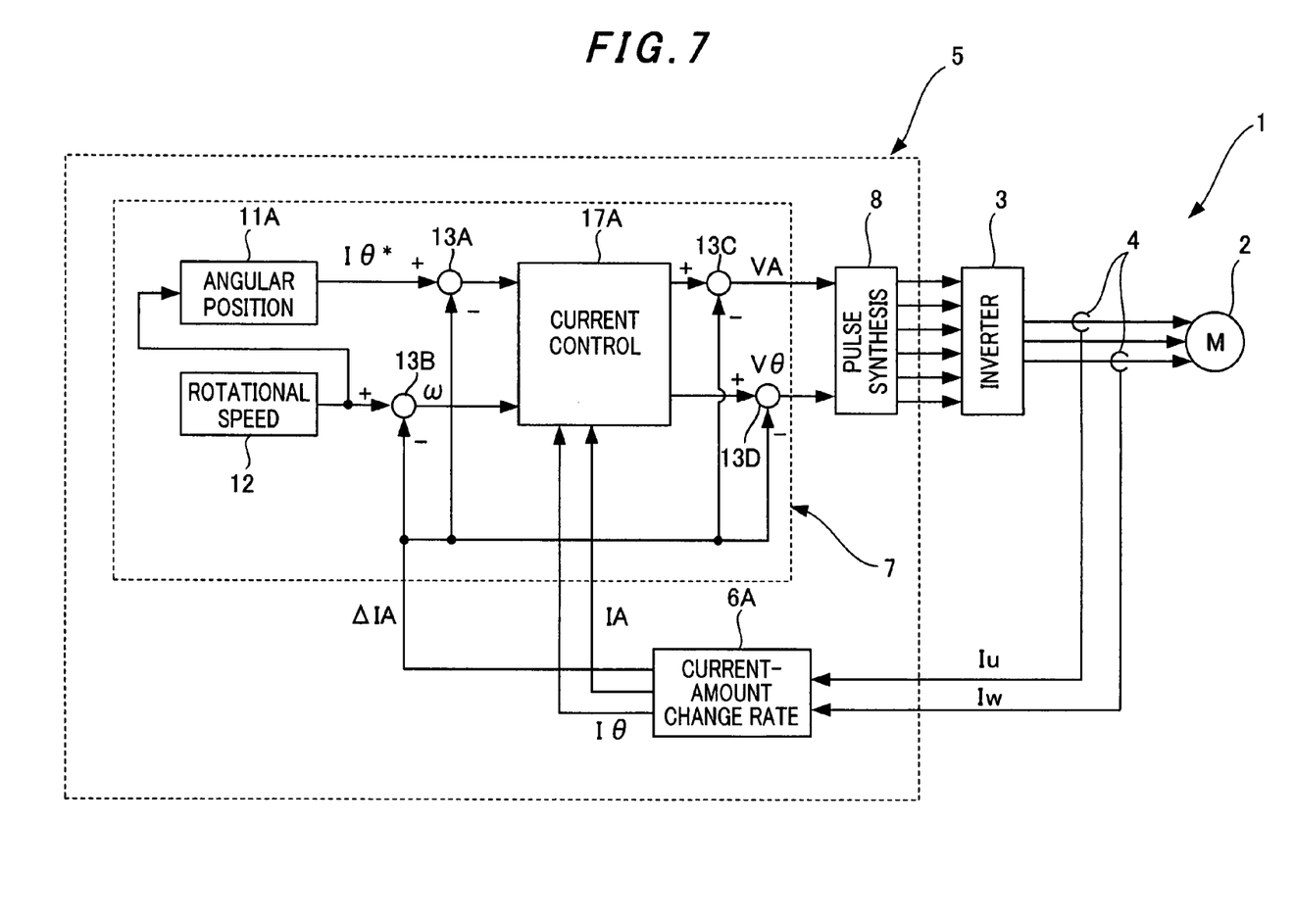
FIG. 7 is an electrical block diagram showing a control apparatus for a synchronous motor, which is according to a third embodiment of the present invention.

Referring to FIG. 7, a fourth embodiment of the control apparatus will now be described.

In a control apparatus shown in FIG. 7, there is provided a current-amount change rate calculator 6A, which calculates the magnitudes IA of the phase currents (i.e., the current amplitude) which compose the current amount and the current phase Iθ, other than the current-amplitude change rate ΔIA. In addition, the voltage characteristic calculator 7 is provided with a position estimator 11A calculating a current-phase command value Iθ° by using the rotation speed ω computed by the speed commander 12.

Further, the voltage characteristic calculator 7 is provided with a current controller 17A calculating both of a voltage amplitude VA and a voltage phase Vθ which make the current phase Iθ agree with the current-phase command value Iθ°. For performing this calculation of the voltage amplitude VA and voltage phase Vθ, used is a target value (i.e., a phase difference to be targeted) ξ¤ for a phase difference ξ between the applied voltages and the current phases (hereinafter, simply called "phase difference"). The phase difference to be targeted ξ¤ is preserved in a memory as data of the current amount or programs, and is calculated using the current amplitude IA. The calculated current-phase command value Iθ¤ is subject to correction based on the current-amplitude change rate ΔIA, before being used for computation of both of the voltage amplitude VA and the voltage phase Vθ.

As described, in the current controller 17A, a current amplitude IA is used for computing a phase difference to be targeted ξ¤ using the current amplitude IA. Then, both of this phase difference to be targeted ξ¤ and a current-phase command value Iθ°, which has been corrected with the current-amplitude change rate ΔIA, are used to calculate the voltage phase Vθ. In addition, using both of the current-phase command value Iθ¤ which has been corrected with the current-amplitude change rate ΔIA and a current phase Iθ which has been calculated by the calculator 6, a difference Δξ between the phase difference ξ and the phase difference to be targeted ξ¤ is calculated. Thus, to make this difference ξ agree with a predetermined value, the voltage phase Vθ is corrected.

To sum up, the voltage phase Vθ from the current controller 17A undergoes the correction involving the current-amplitude change rate ΔIA, before being subjected to the synthesis of pulses into command signals at the pulse synthesizer 8.

In this way, the current controller 17A is able to calculate both of the voltage amplitude VA and the voltage phase Vθ so that the current phase Iθ agrees with the current-phase command value Iθ¤. Hence, without computing the angular positions θ, the synchronous motor 2 can be driven in a controlled manner.

Fifth Embodiment

Figure 8:
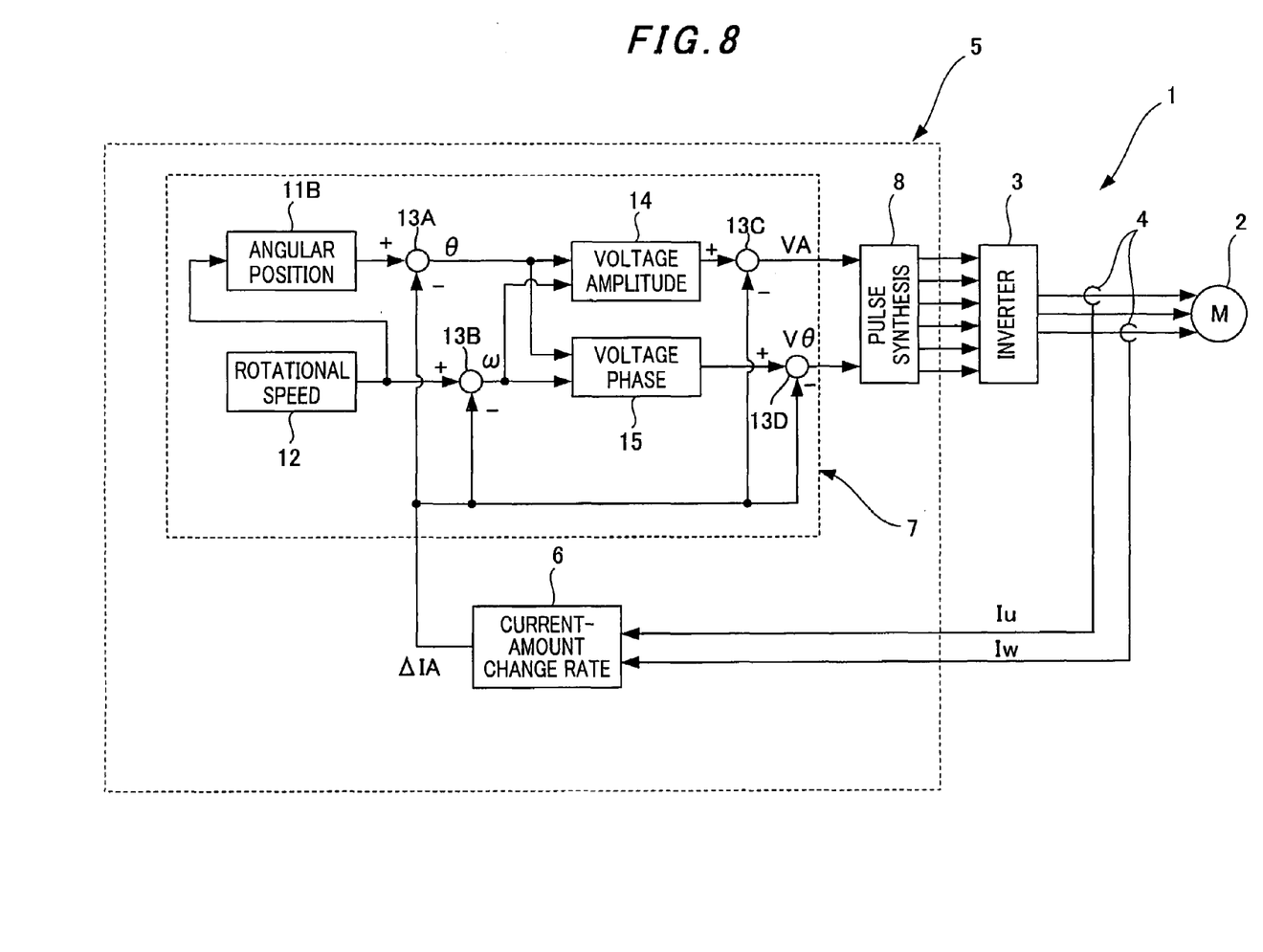
FIG. 8 is an electrical block diagram showing a control apparatus for a synchronous motor, which is according to a fourth embodiment of the present invention.
Figure 9A:
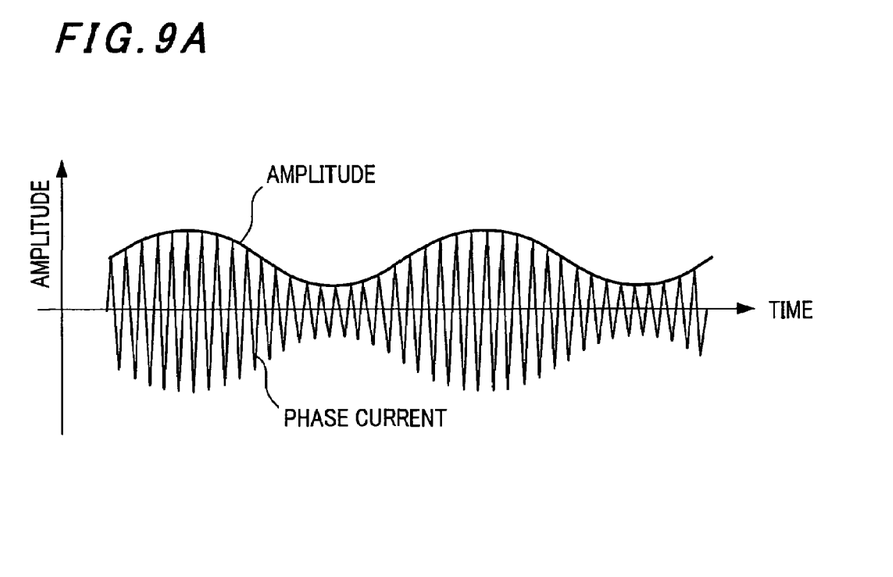
FIGS. 9A and 9B explain a difference between amplitudes of phase currents.
Figure 9B:
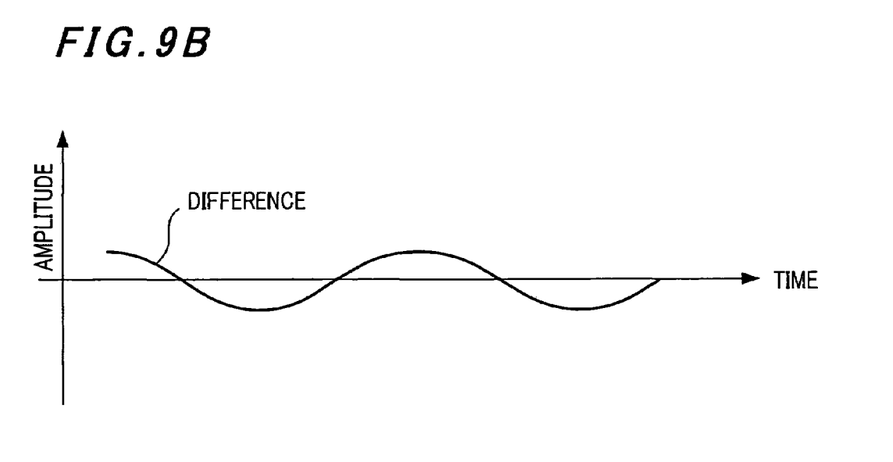

Referring to FIG. 8, a fifth embodiment of the control apparatus will now be described.

As shown in FIG. 8, instead of calculating the angular positions θ based on the current detection signals Iu and Iw, a control apparatus 1 is provided with a positional estimator 11B receives a signal indicative of the rotational speed ω calculated by the speed commanding unit 12 and calculates an angular position θ by integrating the rotational speed ω.

This configuration eliminates the necessity of estimating the angular positions θ using complicated formulae and data mapping tables. Hence the angular positions θ can be calculated easily.

Variations

Although the foregoing embodiments have been explained on the assumption that the "current amount" is expressed by the amplitude Iαβ of the current amplitude IA or current vector (Iα, Iβ), this is not a definitive list. The followings are the variations of the current amount.

For example, the current amount may be the amplitude of a phase current which is maximum in amplitude among the U, V and W phases at the same arbitrary time instant. Alternatively, the current amount may be the amplitude of a q-axis current obtained by converting the phase currents at the U, V and W phases to the q-axis perpendicular to the pole axes (d-axes) of the field poles of the rotor. Still, the amplitude of a current vector (Id, Iq) calculated from the dq-axes currents may also be employed as the current amount.

Furthermore, either current characteristics (root-mean-square values or average values) computed by the current sensors 4, and current-amount change rate calculator 6 by using integrated values of a phase current or wave height values of a phase current still may be used as the current amount. The integrated values or the wave height values can be obtained directly from measured current amounts, without performing complicated processing, such as vector conversion, on the measured current amounts. The current amounts are easier to be detected and measured using the signals from the current sensors 4, so that employing such values as integrated values or wave height values lessens a burden on the computation of the control apparatus.

Still, instead of the phase currents, a current flowing through a bus line (DC bus line) in the inverter 3 may be detected as a current to be detected, where the detected bus-line current is subjected to integration every intervals to provide integrated values. And current characteristic values (root-mean-square values or average values computed based on the integrated values or wave height values of the detected current may be used as the current amount.

Another variation is concerned with the current-amount change rate calculator 6.

As described, this calculator 6 is able to calculate a high-frequency component of the current amount using the current detection signals Iu and Iw and also calculate the current-amount change rate using the calculated high-frequency component. However this is one example. As a variation, the current detection signals Iu and Iw may be used to produce a difference between current amounts at present and current amounts detected in the past. Hence the difference thus-calculated can be used to calculate the current-amount change rate.

Another variation can also be true of the current sensors 4. In the foregoing embodiments, the current sensors 4 are loaded to only the U and W phases of the three U, V and W phase armature coils, so that the two-phase phase currents are detected. This sensing structure can be developed into a further one, in which only one phase is targeted to the current detection (i.e., a one-phase current is detected solely).

Still another variation can be provided concerning the feedback characteristic regulator 20 described in the third embodiment. The foregoing gain characteristic described together with the foregoing regulator 20 is just one example, in which predetermined values are given to the gain, provided that the current phase Iθ is larger than or equal to a threshold C, while the gain is set to zero, provided the current phase Iθ is less than the threshold C. An alternative example is to invert the opposite gain polarities (positive and negative polarities) between current phases Iθ larger than or equal to a threshold C and current phases Iθ smaller than the threshold.

Moreover, for inverting the polarities of the gain, it is preferred that the gain be designated as being zero over a predetermined range of current phases Iθ including the threshold C. This way of setting the gain will prevent the hunting from occurring.

There is another modification with the feedback characteristic regulator 20. Other than the current phase Iθ to be used for the gain regulation, the regulator 20 may employ other characteristic factors which are closely correlated with the positional error $\epsilon$. Such factors include the voltage phase Vθ, a phase difference $\xi$ between voltage to be applied and a phase current, and the magnitude of the current amount, on one of which the gain can be regulated.

The current controller 17A explained in the fourth embodiment can be modified as follows. Without limiting the calculation of both the voltage amplitude VA and the voltage phase Vθ based on the current phase Iθ, the current controller 17A may have the capability of calculating both the voltage amplitude VA and the voltage phase Vθ on the basis of either the angular position or the voltage phase Vθ.

There can also be provided some modifications concerning the arrangement of the feed-back members according to the present invention. In the foregoing embodiments and modifications, the four adders 13A–13D (or subtracters), which function as the feed-back members, are placed for feed-backing the current-amount change rate to the angular position, rotational speed, voltage amplitude, and voltage phase, respectively. However, this is simply an example. In order to meet the object of the present invention, it is still sufficient that at least one of the four adders 13A–13D is functionally. For example, only the adder 13A (or subtracter) may intervene between the angular position calculator and the voltage-amplitude calculator. Only the two adders 13A and 13B (or subtracters) may intervene between the angular position calculator and the voltage-amplitude calculator and between the rotational speed calculator and the voltage-phase calculator, respectively.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An apparatus for controlling a synchronous motor provided with a stator with a plurality of phases of armature coils to which phase currents are supplied to rotate a rotor disposed to be opposed to the stator, the apparatus comprising:
    a first calculator calculating a voltage characteristic showing a characteristic of voltages to be applied to the armature coils;
    a producer producing a command signal to provide the armature coils with the phase currents on the basis of the voltage characteristic;
    a current detector detecting a signal depending on an amplitude of at least one of the phase currents supplied to the armature coils;
    a second calculator calculating a rate of changes in a current amount indicating amplitudes of the phase currents, by using the signal from the current detector; and
    a feed-back member feed-backing the rate of changes in the current amount into the calculation of the voltage characteristic.

2. The apparatus according to claim 1, wherein the first calculator comprises means for calculating an angular position of the rotor using the signal from the current detector so that the angular position is reflected in the voltage characteristic.

3. The apparatus according to claim 1, wherein the second calculator is structured to calculate the voltage characteristic so that a difference between a phase of at least one of the phase currents and the voltage to be applied to each armature coil is substantially equal to a predetermined phase amount.

4. The apparatus according to claim 1, comprising a regulator regulating a feedback characteristic on the basis of a phase of the phase currents, the feedback characteristic being reflected in the feedback performed by the feed-back member.

5. The apparatus according to claim 4, wherein the feedback characteristic is a gain for the rate of changes in the current amount to be fed back to the calculation of the voltage characteristic.

6. The apparatus according to claim 1, wherein the phase currents are at least two-phase currents and the current amount is an amplitude of a current vector obtained by converting the at least two-phase currents to two currents along two mutually-orthogonal stationary axes.

7. The apparatus according to claim 6, wherein the at least two-phase currents are three-phase currents.

8. The apparatus according to claim 1, wherein the current amount is wave height values of current based on the phase currents.

9. The apparatus according to claim 1, wherein the current amount is characteristic values calculated based on integrated values of current based on the phase currents.

10. The apparatus according to claim 1, wherein the second calculator calculating the rate of changes in the current amount on the basis of a high-frequency component of the current amount.

11. The apparatus according to claim 1, wherein the second calculator using the signal from the current detector to calculate the rate of changes in the current amount on the basis of a difference between the current amount obtained currently and the current amount obtained in the past.

12. The apparatus according to claim 1, wherein the voltage characteristic is made up of a voltage amplitude and a voltage phase of the voltages to be applied to the armature coils.

13. The apparatus according to claim 1, wherein the current amount is an amplitude of the phase currents.

14. The apparatus according to claim 12, wherein the first calculator comprises a calculator calculating an angular position of the rotor, a calculator calculating a rotational speed of the rotor, a voltage-amplitude calculator calculating the voltage amplitude using the angular position and the rotational speed, and a voltage-phase calculator calculating the voltage phase using the angular position and the rotational speed.

15. The apparatus according to claim 14, wherein the feed-back member is composed of at least one of adding members intervening between the angular position calculator and the voltage-amplitude calculator, between the rotational speed calculator and the voltage-phase calculator, after the voltage-amplitude calculator, and after the voltage-phase calculator, and
wherein the adding members add the rate of changes in the current amount to the angular position, the rotational speed, the voltage amplitude, and the voltage phase, respectively, so that the rate is fed back to the angular position, the rotational speed, the voltage amplitude, and the voltage phase, respectively.

16. The apparatus according to claim 15, wherein the feed-back member is composed of the adding members intervening between the angular position calculator and the voltage-amplitude calculator, between the rotational speed calculator and the voltage-phase calculator, after the voltage-amplitude calculator, and after the voltage-phase calculator, respectively.

17. The apparatus according to claim 1, wherein the first calculator, the producer, the second calculator, and the feed-back member are realized by functions performed by a computer system.

18. An apparatus for controlling a synchronous motor provided with a stator with a plurality of phases of armature coils to which phase currents are supplied to rotate a rotor disposed to be opposed to the stator, the apparatus comprising:
first calculating means calculating a voltage characteristic showing a characteristic of voltages to be applied to the armature coils;
producing means producing a command signal to provide the armature coils with the phase currents on the basis of the voltage characteristic;
current detecting means detecting a signal depending on an amplitude of at least one of the phase currents supplied to the armature coils;
second calculating means calculating a rate of changes in a current amount indicating amplitudes of the phase currents, by using the signal from the current detector; and
feed-back means feed-backing the rate of changes in the current amount into the calculation of the voltage characteristic.

19. A method for controlling a synchronous motor provided with a stator with a plurality of phases of armature coils to which phase currents are supplied to rotate a rotor disposed to be opposed to the stator, comprising steps of:
calculating a voltage characteristic showing a characteristic of voltages to be applied to the armature coils;
producing a command signal to provide the armature coils with the phase currents on the basis of the voltage characteristic;
calculating a rate of changes in a current amount indicating amplitudes of the phase currents, by using an amplitude of at least one of the phase currents; and
feed-backing the rate of changes in the current amount into the calculation of the voltage characteristic.

* * * * *